US 8,188,701 B2

(12) United States Patent
Hayashi et al.

(10) Patent No.: US 8,188,701 B2
(45) Date of Patent: May 29, 2012

(54) POWER REGENERATIVE CONVERTER

(75) Inventors: Yoshitomo Hayashi, Tokyo (JP);
Akihiko Iwata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 498 days.

(21) Appl. No.: 12/524,316

(22) PCT Filed: Apr. 10, 2007

(86) PCT No.: PCT/JP2007/057860
§ 371 (c)(1),
(2), (4) Date: Jul. 23, 2009

(87) PCT Pub. No.: WO2008/129623
PCT Pub. Date: Oct. 30, 2008

(65) Prior Publication Data
US 2010/0052598 A1  Mar. 4, 2010

(51) Int. Cl.
H02P 27/06 (2006.01)
H02P 3/14 (2006.01)
H02P 3/18 (2006.01)
(52) U.S. Cl. ...................... 318/759; 318/376
(58) Field of Classification Search ............ 318/759, 318/376
See application file for complete search history.

(56) References Cited

U.S. PATENT DOCUMENTS 5,594,350 A   1/1997   Koizumi et al.

FOREIGN PATENT DOCUMENTS

| JP | 5-304779 A | 11/1993 |
|----|-----------|---------|
| JP | 7107747 A | 4/1995 |
| JP | 7-218557 A | 8/1995 |
| JP | 8-331860 A | 12/1996 |
| JP | 10-127056 A | 5/1998 |
| JP | 2000-59995 A | 2/2000 |
| JP | 2000-253686 A | 9/2000 |
| JP | 2004-180427 A | 6/2004 |

OTHER PUBLICATIONS

Japanese Office Action issued on May 27, 2011 in the corresponding Japanese Patent Application No. 2009-510661.
International Search Report for PCT/JP2007/057860 dated Jun. 5, 2007.

Primary Examiner — Walter Benson
Assistant Examiner — Erick Glass
(74) Attorney, Agent, or Firm — Sughrue Mion, PLLC

(57) ABSTRACT

There are provided a smoothing capacitor (71) for storing an induced electromotive force generated by a three-phase induction motor (5), a regenerative transistor (81 to 86) for switching a terminal voltage of the smoothing capacitor to carry out a power regenerating operation over a three-phase AC power supply (3), a line voltage detecting portion (6) for detecting a line voltage of the three-phase AC power supply, a fundamental waveform generating portion (10) for generating, from a signal output from the line voltage detecting portion, a fundamental waveform defined to be a line voltage waveform of the three-phase AC power supply in which a source voltage distortion component is not mixed, a base driving signal creating portion (7) for creating a base driving signal to be used for an ON/OFF control of the regenerative transistor based on a signal output from the fundamental waveform generating portion, and a base driving signal output portion (9) for outputting the base driving signal.

10 Claims, 12 Drawing Sheets

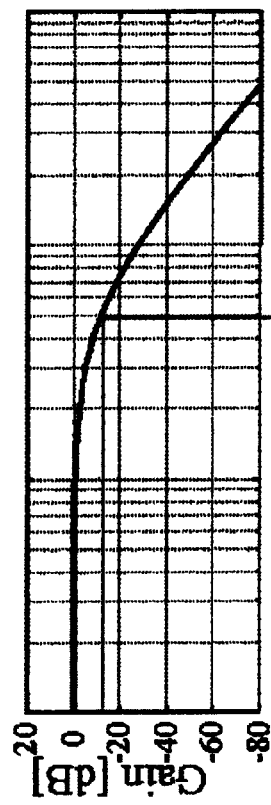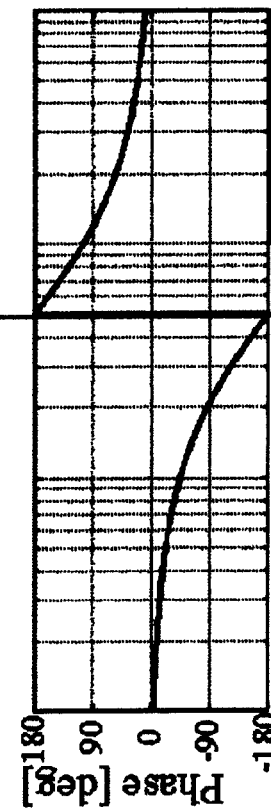
FIG. 5 (a) BODE DIAGRAM FOR I(s)
FIG. 5 (b) BODE DIAGRAM FOR H(s)

POWER REGENERATIVE CONVERTER

TECHNICAL FIELD

The present invention relates to a power regenerative converter.

BACKGROUND ART

A power regenerative converter is disposed between an inverter device for variable speed controlling a three-phase induction motor and a three-phase AC power supply and a reactor is provided between the three-phase AC power supply and the power regenerative converter. The power regenerative converter regenerates, in a three-phase AC power supply, an induced electromotive force generated in a speed reduction of a three-phase induction motor (hereinafter referred to as a motor). When a speed of the motor is reduced, a current obtained by the induced electromotive force thus generated flows into both terminals of a smoothing capacitor in the power regenerative converter. When a regenerative transistor of the power regenerative converter is turned ON, a regenerative current flows from the smoothing capacitor into a power supply.

Thus, a difference between a voltage of the smoothing capacitor of the power regenerative converter and a source voltage is utilized to cause a current to flow with a current limitation by the reactor. If a phase of the regenerative transistor to be turned ON is taken erroneously, therefore, the difference in a voltage is increased and a large current suddenly flows so that an apparatus might be stopped or broken down. For this reason, a DC bus voltage value is compared with a regeneration starting voltage value, and a regenerating operation is started when the DC bus voltage value is higher than the regeneration starting voltage. For a command to be given to each regenerative transistor during the regenerating operation, moreover, an ON/OFF signal of the regenerative transistor which is generated based on a phase of a detected three-phase line voltage is used to carry out the power regenerating operation (for example, see Patent Document 1).

Patent Document 1: JP-A-2000-253686 Publication (Paragraphs 0018 to 0021, FIG. 1)

DISCLOSURE OF THE INVENTION

Problems to be Solved

However, a conventional power regenerative converter detects a line voltage phase through zero cross point monitoring of a line voltage. In some cases in which a source voltage distortion is mixed into the three-phase AC power supply, therefore, the detection of the line voltage phase is disordered. Moreover, an ON/OFF control signal of the regenerative transistor is created from a phase detecting signal. For this reason, a switching ON/OFF timing is disordered so that an excessively large current flows in some cases. There is a possibility that a system might be stopped due to a breakage of a power supply or an apparatus.

In order to solve the problems, it is an object of the invention to obtain a power regenerative converter capable of carrying out a stable regenerating operation also in the case in which a source voltage distortion is mixed into a three-phase AC power supply.

Means for Solving the Problems

The invention provides a power regenerative converter including a smoothing capacitor for storing an induced electromotive force generated by a three-phase induction motor, a regenerative transistor for switching a terminal voltage of the smoothing capacitor to carry out a power regenerating operation over a three-phase AC power supply, a line voltage detecting portion for detecting a line voltage of the three-phase AC power supply, a fundamental waveform generating portion for generating, from a signal output from the line voltage detecting portion, a fundamental waveform defined to be a line voltage waveform of the three-phase AC power supply in which a source voltage distortion component is not mixed, a base driving signal creating portion for creating a base driving signal to be used for an ON/OFF control of the regenerative transistor based on a signal output from the fundamental waveform generating portion, and a base driving signal output portion for outputting the base driving signal.

Advantage of the Invention

According to the invention, the voltage phase can be accurately detected from the fundamental waveform of the source voltage. Therefore, it is possible to generate the ON/OFF control signal of the regenerative transistor without an influence of a distortion component. Consequently, it is possible to implement a power regenerative converter which can prevent an apparatus or a power supply from being broken down due to an overvoltage or an overcurrent, thereby hindering a system from being stopped.

BRIEF DESCRIPTION OF THE DRAWINGS

FIG. 5 is a Bode diagram for a low-pass filter.

EXPLANATION OF THE DESIGNATION 1, 1A, 1B power regenerative converter, 3 three-phase AC power supply, 5 three-phase induction motor, 6 line voltage detecting portion, 7 base driving signal creating portion, 8 PN bus voltage detecting portion, 9, 9A base driving signal output portion, 10 fundamental waveform generating portion, 11 distortion component extracting portion, 12 reference voltage detecting potion, 21 radio frequency component removing filter, 22 frequency calculating portion, 23 correcting portion, 24 distortion component frequency detecting portion, 25 distortion voltage detecting portion, 26 distortion ratio calculating portion, 27, 28, 29, 41 subtractor, 40 distortion component correcting portion, 42 adder, 43 comparator, 44 switch, 70 regenerating portion, 71 smoothing capacitor, 81, 82, 83, 84, 85, 86 regenerative transistor.

BEST MODE FOR CARRYING OUT THE INVENTION

First Embodiment

Figure 1:
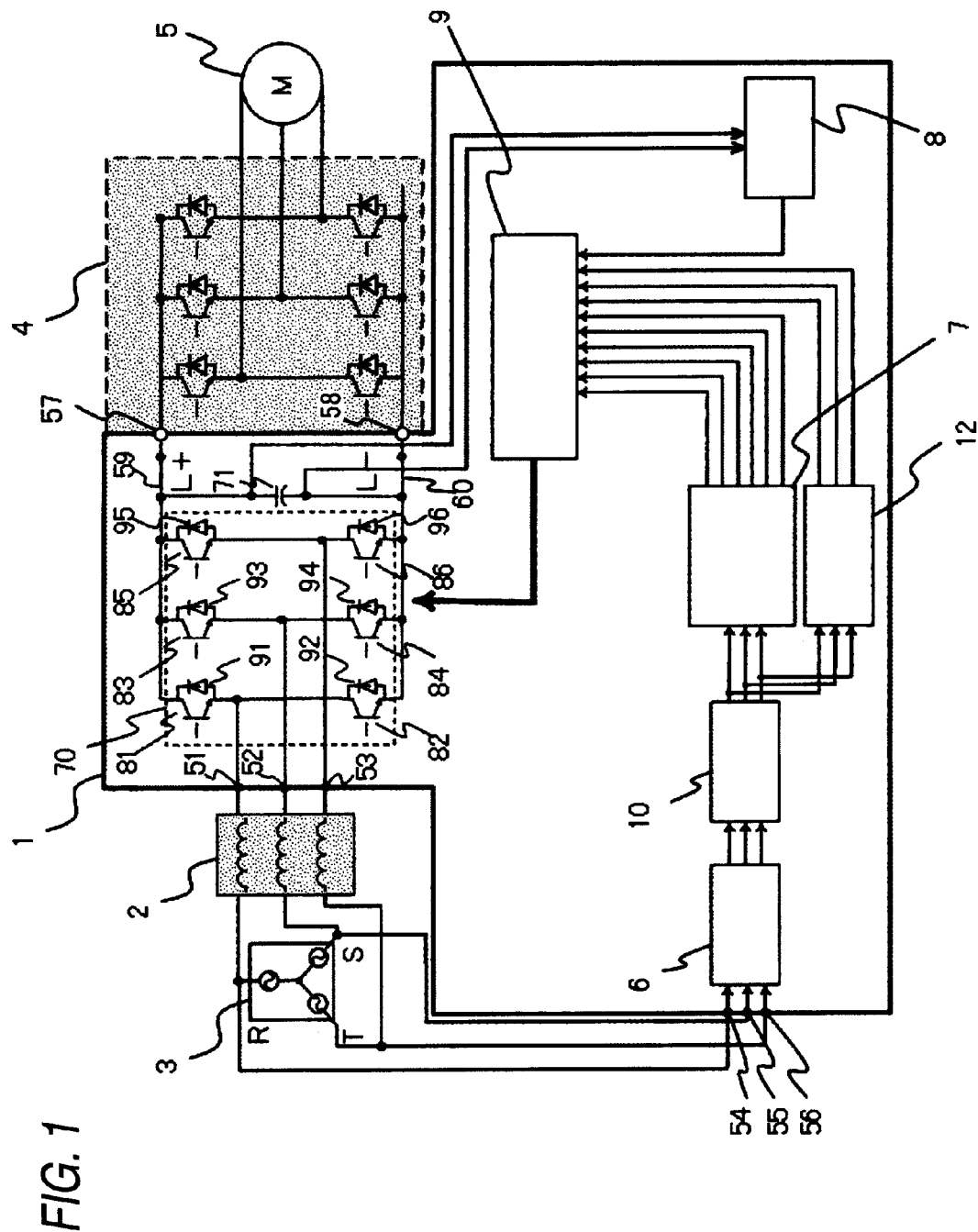
FIG. 1 is a block diagram showing a structure of a power regenerative converter.

FIG. 1 is a block diagram showing a structure of a power regenerative converter according to the embodiment. The structure will be described below. A power regenerative converter 1 is disposed between a three-phase AC power supply 3 for generating AC powers having three phases (R, S and T phases) and an inverter device 4 for variable speed controlling a motor 5. The power regenerative converter 1 includes AC power terminals 51, 52, 53, 54, 55 and 56. The AC power terminals 51, 52 and 53 are connected to respective power terminals of the three-phase AC power supply 3 through a reactor 2, and the AC power terminals 54, 55 and 56 are connected to the respective power terminals of the three-phase AC power supply 3 without the reactor 2. Moreover, DC power terminals 57 and 58 of the power regenerative converter 1 are connected to DC buses in the inverter device 4. DC buses 59 and 60 connected to the DC power terminals 57 and 58 are disposed in the power regenerative converter 1, and a smoothing capacitor 71 is connected between the DC buses 59 and 60. Both terminals of the smoothing capacitor 71 are connected to a PN bus voltage detecting portion 8 for detecting voltages on both terminals of the smoothing capacitor 71.

A regenerating portion 70 including regenerative transistors 81, 82, 83, 84, 85 and 86 and diodes 91, 92, 93, 94, 95 and 96 is provided between the DC buses 59 and 60 in the power regenerative converter 1, and three sets of the regenerative transistors 81 and 82, the regenerative transistors 83 and 84 and the regenerative transistors 85 and 86 which are connected in series are connected in parallel between the DC buses 59 and 60. More specifically, collector terminals of the regenerative transistors 81, 83 and 85 constituting an upper arm are connected to the DC bus 59, and emitter terminals of the regenerative transistors 82, 84 and 86 constituting a lower arm are connected to the DC bus 60. An emitter terminal of the regenerative transistor 81 and a collector terminal of the regenerative transistor 82 are, connected to the AC power terminal 51 in common. Similarly, an emitter terminal of the regenerative transistor 83 and a collector terminal of the regenerative transistor 84 are connected to the AC power terminal 52, and an emitter terminal of the regenerative transistor 85 and a collector terminal of the regenerative transistor 86 are connected to the AC power terminal 53. The diodes 91, 92, 93, 94, 95 and 96 are connected to the regenerative transistor 81, 82, 83, 84, 85 and 86 in parallel, respectively. More specifically, an anode terminal of the diode is connected to the emitter terminal of the regenerative transistor, and a cathode terminal of the diode is connected to the collector terminal of the regenerative transistor.

The AC power terminals 54, 55 and 56 are connected to a line voltage detecting portion 6 for detecting a source voltage waveform among the three phases of the three-phase AC power supply 3, and an output terminal of the line voltage detecting portion 6 is connected to a fundamental waveform generating portion 10 for generating a fundamental waveform defined to be a line voltage waveform of the three-phase AC power supply into which a distortion component is not mixed. An output terminal of the fundamental waveform generating portion 10 is connected to a base driving signal creating portion 7 for creating a base driving signal to carry out an ON/OFF control of the regenerative transistor based on a voltage phase of the three-phase AC power supply 3 and a reference voltage detecting portion 12 for calculating a voltage value of the three-phase AC power supply 3 based on an output of the fundamental waveform generating portion 10.

Output terminals of the base driving signal creating portion 7, the reference voltage detecting portion 12 and the PN bus voltage detecting portion 8 are connected to a base driving signal output portion 9 for outputting a base driving signal to carry out an ON/OFF control of the regenerative transistor based on the voltage value of the three-phase AC power supply 3 and voltage values of the both terminals of the smoothing capacitor 71, and an output terminal of the base driving signal output portion 9 is connected to corresponding base terminals of the regenerative transistors 81, 82, 83, 84, 85 and 86, respectively.

Although a signal input to the line voltage detecting portion 6 is set to be the voltage of each of the phases in the three-phase AC power supply 3 without the reactor 2 in FIG. 1, it may be a voltage of each of the phases in the three-phase AC power supply 3 through the reactor 2.

Next, description will be given to a flow of a regenerative current in the power regenerative converter shown in FIG. 1. First of all, a current obtained by an induced electromotive force generated by a speed reduction of a motor flows into the both terminals of the smoothing capacitor 71. Consequently, a voltage of the smoothing capacitor 71 is raised. For this reason, an electric potential of one of the phases which is indicative of a maximum electric potential in the three-phase source voltages supplied from the power supply is lower than a positive electrode of the smoothing capacitor 71, and an electric potential of one of the phases which is indicative of a minimum electric potential in the three-phase source voltages is higher than an electric potential of a negative electrode of the smoothing capacitor 71. Accordingly, a difference in an electric potential is generated between the three-phase source voltages which are supplied and the smoothing capacitor 71. Therefore, a regenerative current flows from the smoothing capacitor 71 to the power supply by an ON operation of the regenerative transistor.

Thus, the difference between the voltage of the smoothing capacitor in the power regenerative converter and the source voltage is utilized to cause the current to flow with a current limitation through the reactor. When the phase of the regenerative transistor to be turned ON is taken erroneously, therefore, the difference in a voltage is increased. Consequently, there is a possibility that a large current might suddenly flow, resulting in a stoppage or breakage of an apparatus. For this reason, it is important to detect the phase of the power supply and to carry out the ON/OFF control of the regenerative transistor.

The ON/OFF control of the regenerative transistor using a base driving signal will be described below.

Figure 2:
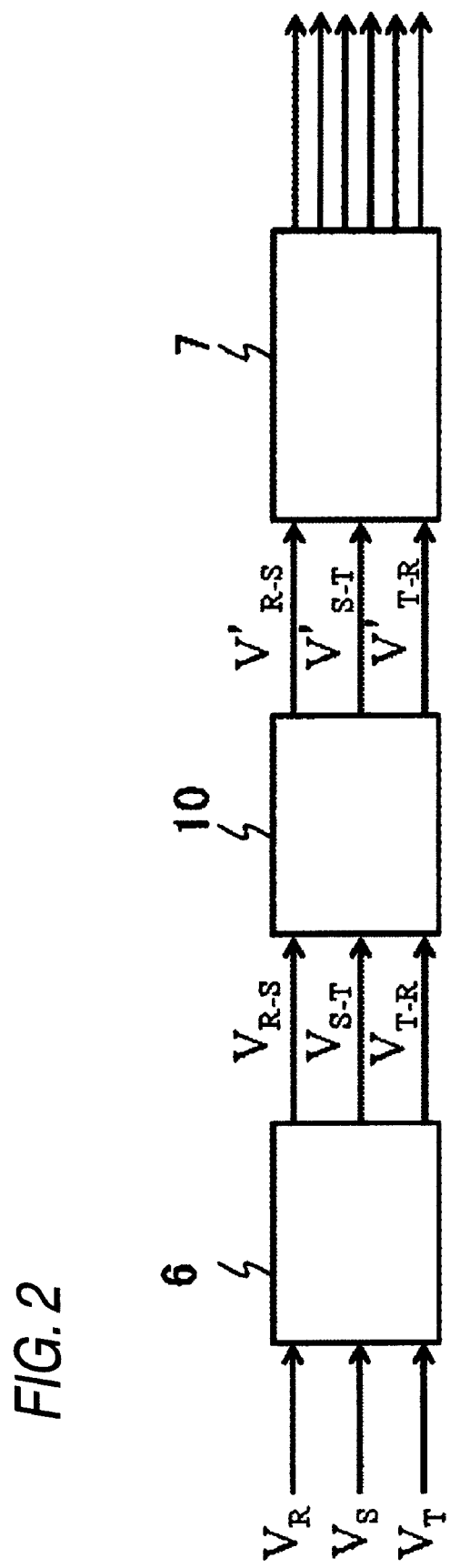
FIG. 2 is a block diagram showing a part from a line voltage detecting portion to a base driving signal creating portion.
Figure 3:
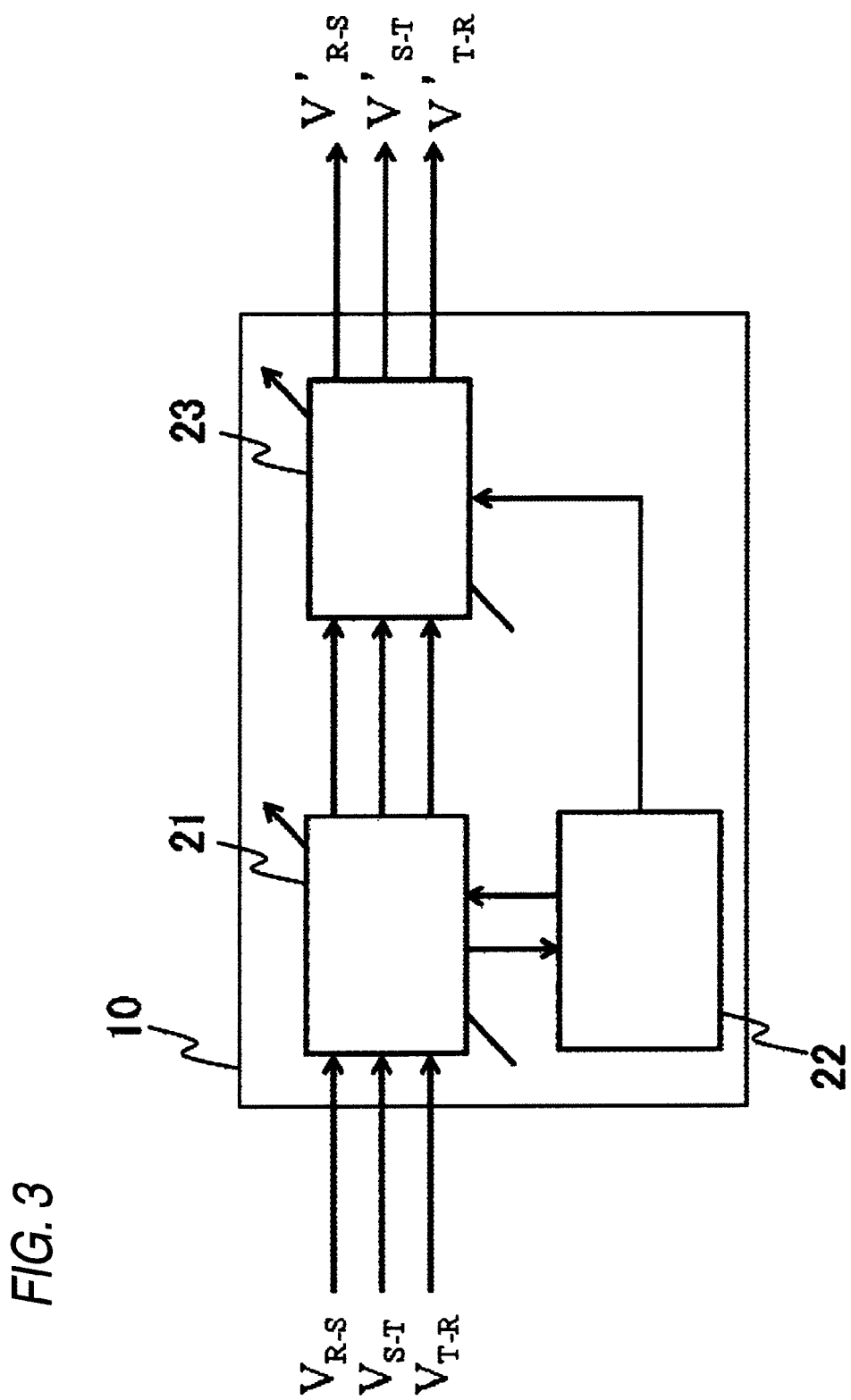
FIG. 3 is a block diagram showing an internal structure of a fundamental waveform generating portion.
Figure 4:
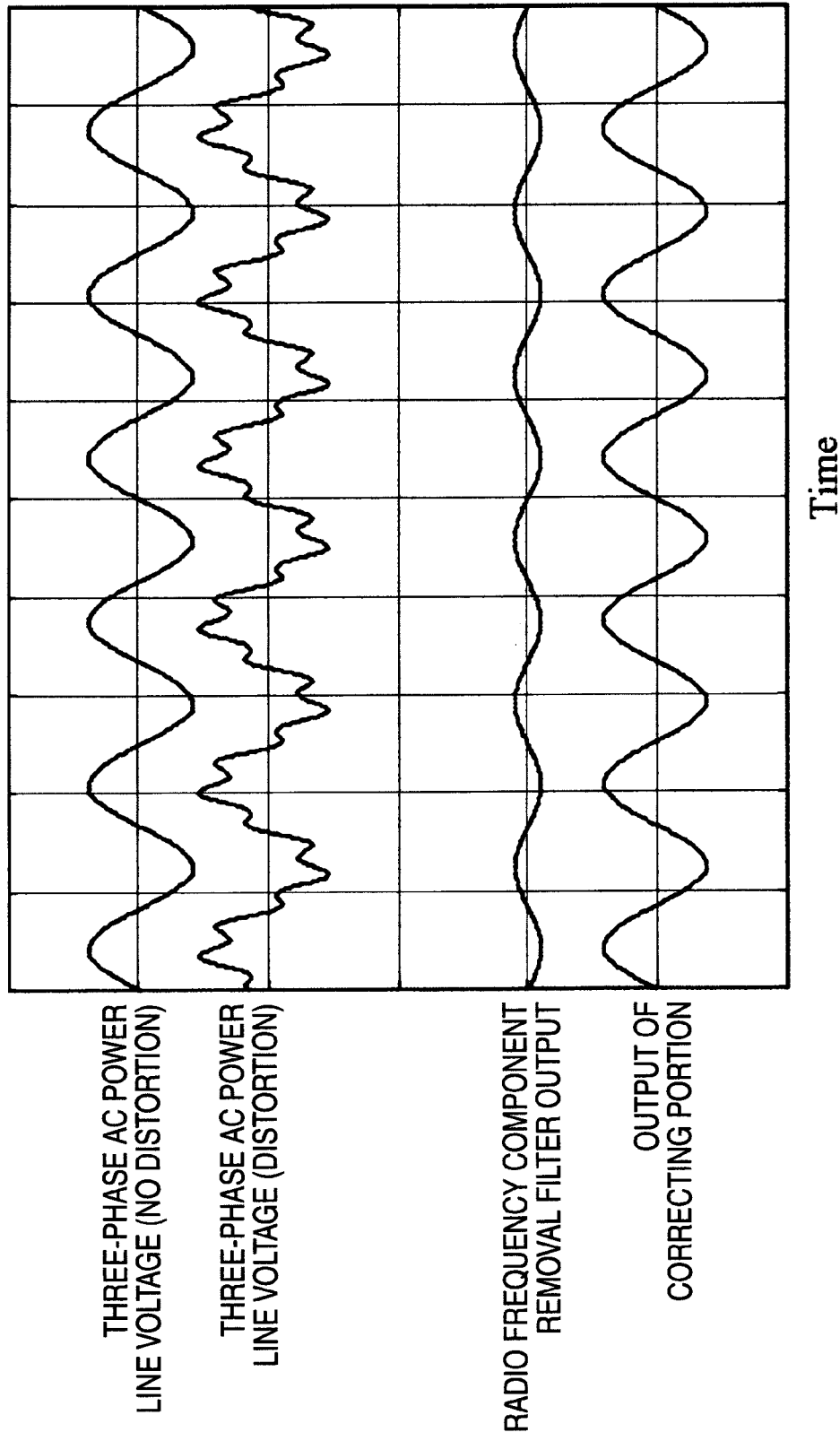
FIG. 4 is a chart showing an output waveform of the line voltage detecting portion and that of the fundamental waveform generating portion.

FIG. 2 is a block diagram showing a part from the line voltage detecting portion 6 to the base driving signal creating portion 7. FIG. 3 is a block diagram showing an internal structure of the fundamental waveform generating portion 10. FIG. 4 is a chart showing an output waveform of the line voltage detecting portion 6 and that of the fundamental waveform generating portion 10. FIG. 5 is a Bode diagram for a primary low-pass filter I(s) and a quaternary low-pass filter H(s).

As shown in FIG. 2, the line voltage detecting portion 6 inputs voltage waveforms VR, VS and VT of the three-phases of the three-phase AC power supply 3 and detects and outputs line voltage waveforms VR-S, VS-T and VT-R of the three phases, respectively. The fundamental waveform generating portion 10 inputs the line voltage waveforms VR-S, VS-T and VT-R output from the line voltage detecting portion 6, and generates fundamental waveforms V'R-S, V'S-T and V'T-R from the line voltage waveforms and outputs them to the base driving signal creating portion 7. The base driving signal creating portion 7 uses the fundamental waveforms V'R-S, V'S-T and V'T-R to create base driving signals to be utilized for the ON/OFF control of the regenerative transistor (six signals corresponding to the respective regenerative transistors in the embodiment).

Next, the line voltage detecting portion 6 will be described.

The line voltage detecting portion 6 detects the line voltage waveforms VR-S, VS-T and VT-R among R-S, S-T and T-R lines through the three-phase AC power supply 3. An S-R line voltage waveform is obtained by leading or lagging a phase of the R-S line voltage waveform by 180 degrees, a T-S line voltage waveform is obtained by leading or lagging a phase of the S-T line voltage waveform by 180 degrees, and an R-T line voltage waveform is obtained by leading or lagging a phase of the T-R line voltage waveform by 180 degrees. Accordingly, the S-R, T-S and R-T line voltage waveforms can be calculated from the R-S, S-T and T-R line voltage waveforms which are detected by the line voltage detecting portion 6. Therefore, it is sufficient to detect only the three line voltage waveforms VR-S, VS-T and VT-R.

Next, the fundamental waveform generating portion 10 will be described.

In order to create the base driving signal to be used for the ON/OFF control of the regenerative transistor without an influence of a distortion component of the three-phase AC power supply 3, the fundamental waveform generating portion 10 is set to have the following structure. As shown in FIG. 3, the fundamental waveform generating portion 10 includes a radio frequency component removing filter 21 for removing distortion components from the line voltage waveforms VR-S, VS-T and VT-R of the three-phase AC power supply 3, a frequency calculating portion 22 for calculating a fundamental frequency of the line voltage waveform of the three-phase AC power supply 3 from an output of the radio frequency component removing filter 21, and a correcting portion 23 for correcting an output of the radio frequency component removing filter 21. As shown in FIG. 4, although the distortion component mixed in the line voltage waveform is removed in the radio frequency component removing filter 21, a waveform obtained after the removal has a phase and an amplitude changed. Therefore, the correcting portion 23 uses the fundamental frequency of the line voltage waveform of the three-phase AC power supply 3 which is calculated by the frequency calculating portion 22 to correct the phase and the amplitude changed by removing the distortion component through the radio frequency component removing filter 21 so as to be the same as those of the line voltage waveform of the three-phase AC power supply 3 in the case in which the distortion component is not contained. Accordingly, the fundamental waveform generating portion 10 inputs the line voltage waveforms VR-S, VS-T and VT-R of the three-phase AC power supply 3 and outputs the fundamental waveforms V'R-S, V'S-T and V'T-R to be the line voltage waveforms of the three-phase AC power supply 3 which do not contain the distortion component.

Next, detailed description will be given to the radio frequency component removing filter 21 and an output waveform signal thereof and the correcting portion 23 in the fundamental waveform generating portion 10.

Although the radio frequency component removing filter 21 can be implemented by a system having an FFT analyzer function, and furthermore, can implement the function by various filters such as a low-pass filter and a band-pass filter, description will be given to the case of a quaternary low-pass filter using a secondary low-pass filter in two stages. By the low-pass filter, a distortion component having a radio frequency is removed and the frequency is identical to a frequency of the three-phase AC power supply 3 which does not contain the distortion component.

First of all, the secondary low-pass filter will be described. When ωn represents a break frequency and s represents a Laplace operator, a transfer function G(s) of the secondary low-pass filter is expressed in Equation (1).

[Equation 1]

$$G(s) = \frac{\omega_n^2}{s^2 + 2\omega_n s + \omega_n^2} \quad (1)$$

The transfer function G(s) of the secondary low-pass filter which is expressed in the Equation (1) can be rewritten as Equation (2).

[Equation 2]

$$G(s) = \frac{\omega_n^2}{s^2 + 2\omega_n s + \omega_n^2} \\ = \left(\frac{\omega_n}{s + \omega_n}\right)^2 \quad (2)$$

The Equation (2) indicates that the secondary low-pass filter is equivalent to have a primary low-pass filter with a break frequency ωn[rad/sec] in two stages.

Next, there will be supposed the case of a quaternary low-pass filter using the secondary low-pass filter in two stages. In that case, a quaternary low-pass filter transmission function H(s) is expressed in Equation (3).

[Equation 3]

$$H(s) = \frac{\omega_n^2}{s^2 + 2\omega_n s + \omega_n^2} \times \frac{\omega_n^2}{s^2 + 2\omega_n s + \omega_n^2} \\ = \left(\frac{\omega_n}{s + \omega_n}\right)^4 \quad (3)$$

The Equation (3) indicates that the quaternary low-pass filter is equivalent to have the primary low-pass filter with the break frequency ωn[rad/sec] in four stages.

When the transmission function of the primary low-pass filter is represented by I(s), a gain attenuation g and a phase lag amount φ after a passage through I(s) are expressed in Equations (4) and (5) (ω is an optional frequency).

[Equation 4]

$$g = 20\log|I(j\omega)| = 20\log\frac{1}{\sqrt{1 + (\omega/\omega_n)^2}} \quad (4)$$

[Equation 5]

$$\phi = \angle I(j\omega) = -\tan^{-1}\left(\frac{\omega}{\omega_n}\right) \quad (5)$$

The quaternary low-pass filter H(s) using the secondary low-pass filter in two stages is equivalent to have the primary low-pass filter I(s) in four stages. Therefore, a gain attenuation gh and a phase lag amount φh in the radio frequency component removing filter 21 are expressed in Equations (6) and (7).

[Equation 6]

$$gh = 4 \times g = 80\log\frac{1}{\sqrt{1 + (\omega/\omega_n)^2}} \quad (6)$$

[Equation 7]

$$\phi h = 4 \times \phi = -4\tan^{-1}\left(\frac{\omega}{\omega_n}\right) \quad (7)$$

In the case in which the radio frequency component removing filter 21 is the quaternary low-pass filter H(s) using the secondary low-pass filter in two stages, accordingly, it is apparent, from the Equations (6) and (7), that the gain attenuation gh and the phase lag amount φh in the radio frequency component removing filter 21 are four times as large as the gain attenuation g and the phase lag amount φ in the primary low-pass filter I(s).

Moreover, FIG. 5 is a Bode diagram in which a gain to frequency relationship and a phase to frequency relationship are represented on rectangular coordinates and are caused to make a set respectively for each of the primary low-pass filter I(s) and the quaternary low-pass filter H(s). From the Bode diagram, it is apparent that the gain attenuation gh and the phase lag amount φh in the quaternary low-pass filter H(s) are four times as large as the gain attenuation g and the phase lag amount φ in the primary low-pass filter I(s), respectively.

As shown in FIG. 4, the frequency of the output waveform of the radio frequency component removing filter 21 is equal to that of the line voltage waveform of the three-phase AC power supply 3. After the fundamental frequency of the line voltage waveform of the three-phase AC power supply 3 is calculated in the frequency calculating portion 22, therefore, the break frequency on of the radio frequency component removing filter 21 is changed to be the fundamental frequency. The phase lag amount φ of a waveform signal output from the filter which is expressed in the Equation (3) with respect to the line voltage waveform signal of the three-phase AC power supply 3 which does not contain the distortion is calculated by the Equation (7) and is 180 degrees (=π). Although the phase of the line voltage is detected without an influence, furthermore, the amplitude of the waveform signal output from the filter which is expressed in the Equation (3) is calculated by using the Equation (6) and is a quarter of the amplitude of the line voltage waveform of the three-phase AC power supply 3 which does not contain the distortion. Accordingly, the output of the radio frequency removing filter 21 is a waveform signal obtained by lagging the amplitude and the phase by ¼ and 180 degrees as compared with the line voltage waveform of the three-phase AC power supply 3 which does not contain the distortion.

An operation of the fundamental waveform generating portion 10 will be described below by using a specific line voltage waveform.

When a line voltage waveform between two certain phases in the three-phase AC power supply 3 is set to be a sin waveform, a line voltage waveform y1(t) to be a signal which has not been input to the radio frequency component removing filter 21 can be expressed in Equation (8). A represents an amplitude and t represents a time. It is supposed that the distortion component is not mixed at all.

[Equation 8]

$$y_1(t) = A \sin(\omega_n t) \quad (8)$$

In an output waveform signal y2(t) of the radio frequency component removing filter 21 in an input of the line voltage expressed in the Equation (8), an amplitude is a quarter and a phase is lagged by 180 degrees (=π) with respect to the line voltage waveform having no distortion as described above. Therefore, Equation (9) is obtained.

[Equation 9]

$$y_2(t) = \frac{A}{4} \sin(\omega_n t - \pi) \quad (9)$$
$$= -\frac{A}{4} \sin(\omega_n t)$$

In order to cause the output waveform signal y2(t) of the radio frequency component removing filter 21 which is expressed in the Equation (9) to be equal to the line voltage waveform y1(t) of the three-phase AC power supply 3 which is expressed in the Equation (8), the phase lag and the amplitude attenuation are corrected by the correcting portion 23. In this case, the correcting portion 23 is constituted by a filter for carrying out a constant multiplication over the amplitude. If the output signal y2(t) of the radio frequency component removing filter 21 is multiplied by −4, the amplitude is corrected and the phase lag is also corrected. Consequently, it is possible to generate a false fundamental waveform corresponding to the line voltage waveform between the two phases.

The correcting portion 23 has a function for calculating a phase lag amount and a gain attenuation in addition to the filter for carrying out the constant multiplication, and these functions can be implemented by various techniques. For example, it is possible to propose a method of correcting a phase lag by means of an all-pass filter having zero amplitude attenuation and capable of operating only a phase.

As described above, the fundamental waveform generating portion 10 inputs the line voltage waveforms VR-S, VS-T and VT-R of the three-phase AC power supply 3, removes the distortion portion of the line voltage waveforms of the three-phase AC power supply 3 by means of the radio frequency component removing filter 21, corrects the amplitudes and phases of the waveforms thus obtained so as to be equal to those of the line voltage waveforms of the three-phase AC power supply 3 through the correcting portion 23, and generates and outputs the fundamental waveforms V'R-S, V'S-T and V'T-R to be the line voltage waveforms of the three-phase AC power supply 3 which do not contain the distortion component.

The base driving signal creating portion 7 will be described below.

Figure 6:
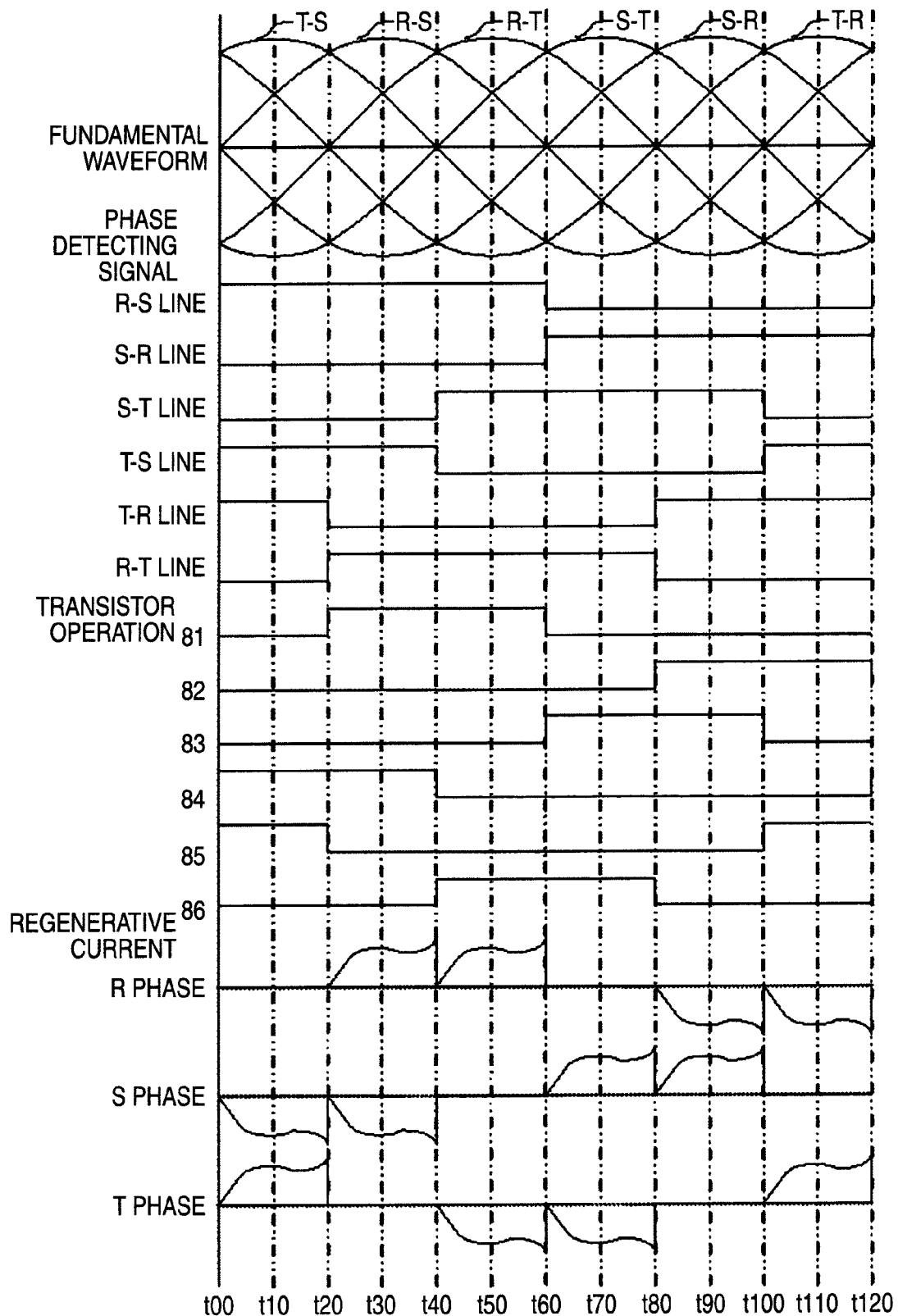
FIG. 6 is a time chart in a regenerating operation.

FIG. 6 is a time chart in the regenerating operation of the power regenerative converter, showing a temporal change in a phase detecting signal, a regenerative transistor and a regenerative current which corresponds to a change in a voltage of a fundamental waveform.

The base driving signal creating portion 7 shown in FIG. 1 inputs the fundamental waveforms V'R-S, V'S-T and V'T-R which are generated by the fundamental waveform generating portion 10. The phases of the fundamental waveforms V'R-S, V'S-T and V'T-R which are input are led or lagged by 180 degrees to calculate fundamental waveforms V'S-R, V'T-S and V'R-T. More specifically, it is sufficient to multiply the fundamental waveforms V'R-S, V'S-T and V'T-R by −1. A zero cross of each of the fundamental waveforms is detected and the phase detecting signal for each of the fundamental waveforms is created in such a manner that the amplitudes of the fundamental waveforms V'R-S, V'S-T, V'T-R, V'S-R, V'T-S and V'R-T are ON between positive phases and are OFF between negative phases as shown in FIG. 6, for example. The line voltage waveform of the three-phase AC power supply in which the distortion component is not mixed is an almost sin waveform. Therefore, the fundamental waveform is also a sin waveform, and an electric potential of the fundamental waveform is a maximum on a center in an ON phase section of the phase detecting signal and the electric potential of the fundamental waveform is a minimum on a center of an OFF phase section of the phase detecting signal. Accordingly, it is possible to grasp phases indicative of the maximum and minimum electric potentials of the fundamental waveform through each of the phase detecting signals. For each of the regenerative transistors 81 to 86, there is created a base driving signal for carrying out an ON/OFF control of the regenerative transistors 81 to 86 which serves to turn ON any of the regenerative transistors 81, 83 and 85 that is connected to the phase indicative of the maximum electric potential of the three-phase AC source voltage, to turn ON any of the regenerative transistors 82, 84 and 86 that is connected to the phase indicative of the minimum electric potential of the three-phase AC source voltage and to turn OFF the other regenerative transistors. The base driving signal thus created is output to the base driving signal output portion 9.

Next, the regenerating operation will be described.

Figure 7:
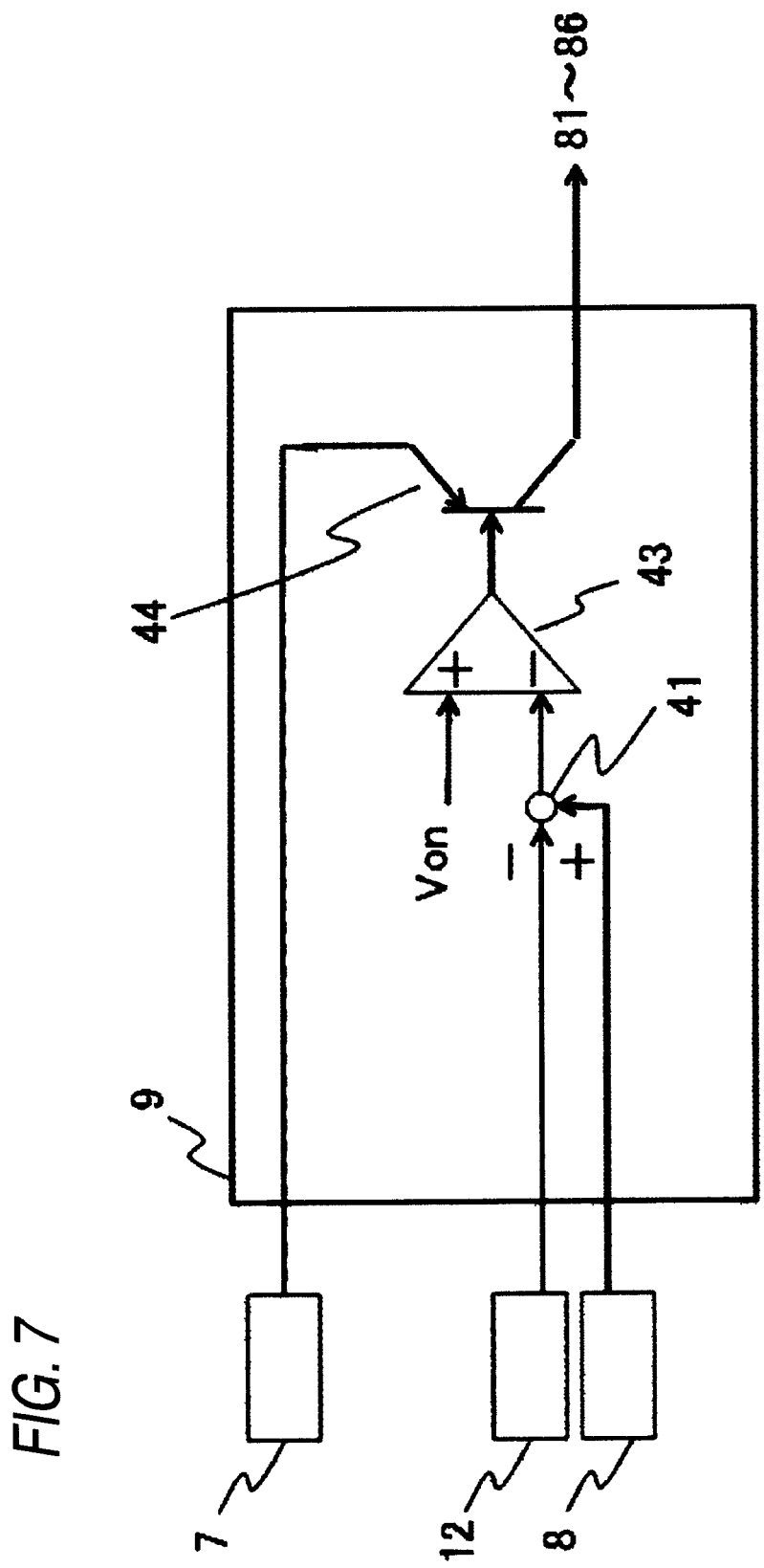
FIG. 7 is a block diagram showing an internal structure of a base driving signal output portion.

In the PN bus voltage detecting portion 8 shown in FIG. 1, the voltages on both terminals of the smoothing capacitor 71 are detected as DC bus voltages and are output to the base driving signal output portion 9. In the reference voltage detecting portion 12, a moving average filter is used to integrate waveforms taking absolute values of the fundamental waveforms V'R-S, V'S-T and V'T-R by one cycle of the fundamental waveform (an inverse number of a frequency), thereby detecting a voltage amplitude. The voltage amplitude value thus detected is set to be a line voltage value of the three-phase AC power supply 3 in the case in which the distortion component is not mixed, and is output to the base driving signal output portion 9. FIG. 7 is a block diagram showing an internal structure of the base driving signal output portion 9. In the base driving signal output portion 9, a signal output from the reference voltage detecting portion 12 and a signal output from the PN bus voltage detecting portion 8 are input to a subtractor 41 to calculate a difference between the voltage value of the three-phase AC power supply 3 and the DC bus voltage value. Then, there is carried out a regenerating operation for inputting, to a comparator 43, a regeneration starting voltage value Von which is preset as a threshold for starting a regenerating operation and the difference between the voltage value of the three-phase AC power supply 3 and the DC bus voltage value which is an output of the subtractor 41 and comparing them with each other, and outputting, to the regenerative transistors 81 to 86, the base driving signal for performing the ON/OFF control of the regenerative transistor which is created by the base driving signal creating portion 7 when the difference between the voltage value of the three-phase AC power supply 3 and the DC bus voltage value is higher than the regeneration starting voltage.

As shown in the time chart for the regenerating operation of the power regenerative converter 1 in FIG. 6, the regenerative transistors 81 and 84 are turned ON when the electric potential of the fundamental waveform V'R-S is a maximum. When the electric potential of the fundamental waveform V'R-T is a maximum, the regenerative transistors 81 and 86 are turned ON. When the electric potential of the fundamental waveform V'S-T is a maximum, the regenerative transistors 83 and 86 are turned ON. When the electric potential of the fundamental waveform V'S-R is a maximum, the regenerative transistors 82 and 83 are turned ON. When the electric potential of the fundamental waveform V'T-R is a maximum, the regenerative transistors 85 and 82 are turned ON. When the electric potential of the fundamental waveform V'T-S is a maximum, the regenerative transistors 84 and 85 are turned ON.

More specifically, the electric potential of the fundamental waveform V'R-S is a maximum at a time of t20 to t40. Therefore, the regenerative transistors 81 and 84 are turned ON and the other regenerative transistors are turned OFF. Consequently, the smoothing capacitor 71 and the S-R phase of the three-phase AC power supply are connected to the reactor through a power impedance so that the regenerative current flows from the R phase to the S phase. Similarly, the electric potential of the fundamental waveform V'R-T is a maximum at a time of t40 to t60. Therefore, the regenerative transistors 81 and 86 are turned ON and the other regenerative transistors are turned OFF. Consequently, the regenerative current flows from the R phase to the T phase.

As described above, if the fundamental waveform of the line voltage of the three-phase AC power supply 3 is generated, it is possible to detect the fundamental frequency of the line voltage waveform of the three-phase AC power supply, thereby detecting an accurate voltage phase of the three-phase AC power supply from the fundamental waveform without the influence of the distortion component also in the case in which the distortion component is mixed into the three-phase AC power supply 3. In the creation of the base driving signal, by using the fundamental waveform to be the line voltage waveform of the three-phase AC power supply 3 which does not contain the distortion component, it is possible to accurately create, for the voltage phase of the three-phase AC power supply, the base driving signal for carrying out the ON/OFF control of the regenerative transistor which serves to turn ON only the regenerative transistor for connecting two phases of any of the line voltages which is a maximum and to turn OFF the other regenerative transistors. Accordingly, an overvoltage and an overcurrent can be prevented from being applied to the power supply and the regenerative converter in the regenerating operation. Therefore, it is possible to prevent a system from being stopped due to a breakage of the power supply or the regenerative converter due to them.

Second Embodiment

Description will be given to an embodiment in which a function for extracting a distortion component of a three-phase AC power supply and obtaining a distortion frequency, a distortion amplitude and a distortion ratio of the distortion component is added to the first embodiment in order to grasp the distortion component in the case in which the distortion component is mixed into the three-phase AC power supply.

Figure 8:
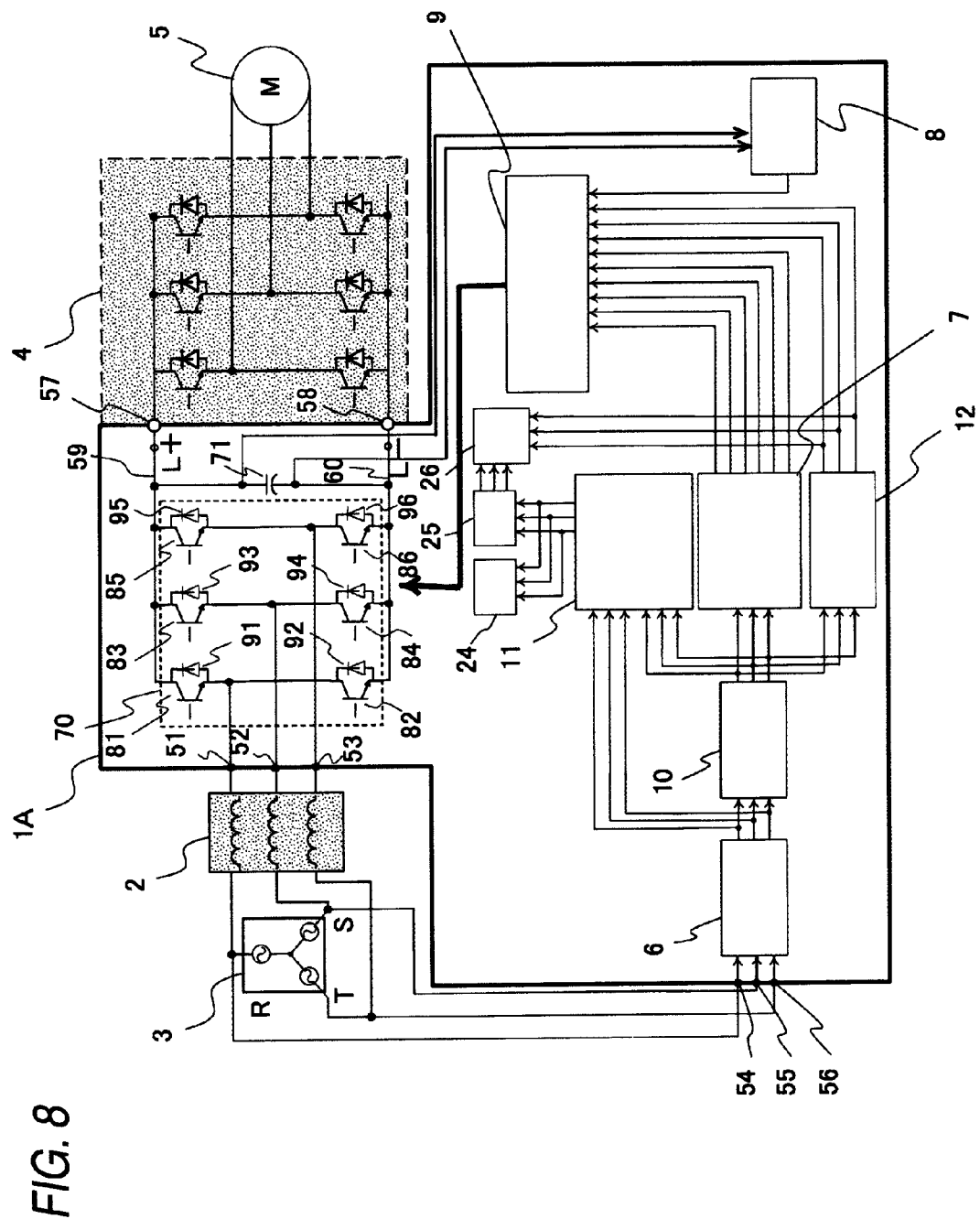
FIG. 8 is a block diagram showing a structure of the power regenerative converter.
Figure 9:
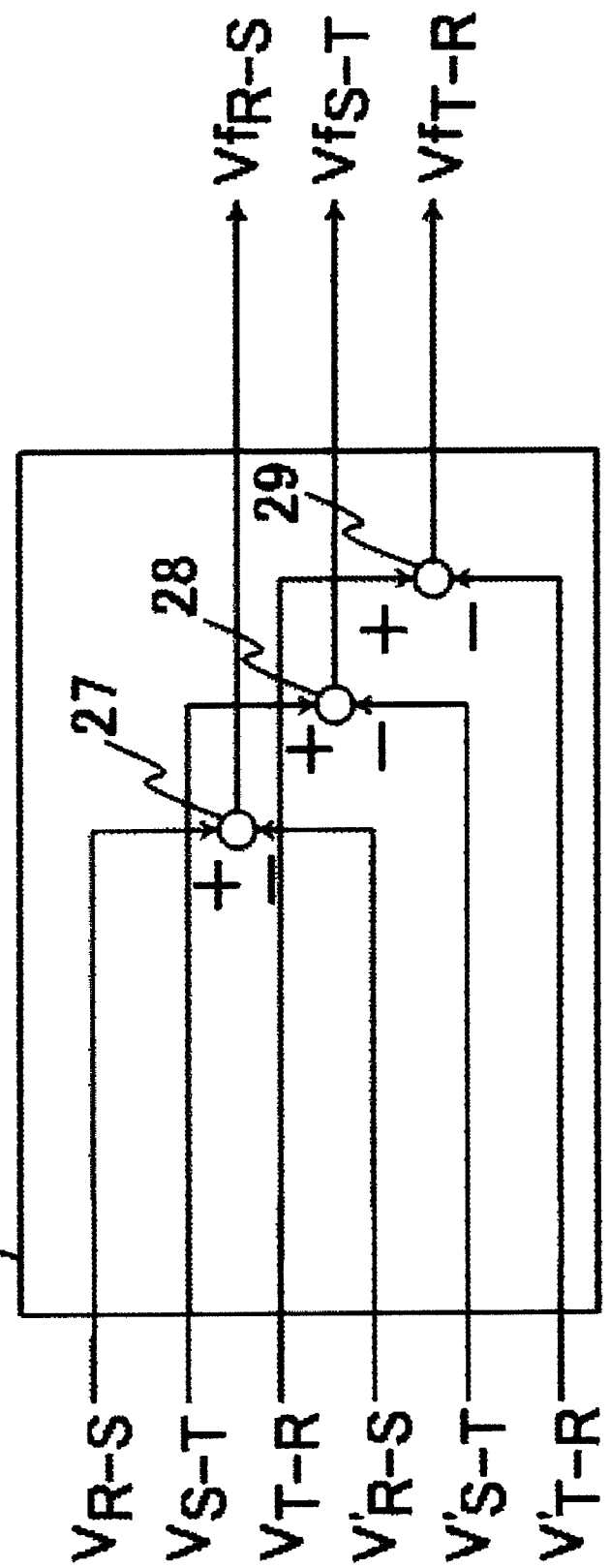
FIG. 9 is a diagram showing an internal structure of a distortion component extracting portion.

FIG. 8 is a block diagram showing a structure of a power regenerative converter according to the embodiment. FIG. 9 is a diagram showing an internal structure of a distortion component extracting portion. In a power regenerative converter 1A according to the embodiment shown in FIG. 8, a distortion component extracting portion 11 for extracting a distortion component to be mixed into a line voltage waveform of a three-phase AC power supply 3 is provided after the fundamental waveform generating portion 10 in the power regenerative converter 1 according to the first embodiment, and furthermore, a distortion component frequency detecting portion 24 for detecting a frequency of the distortion component thus extracted, a distortion voltage detecting portion 25 for detecting a voltage amplitude of the distortion component thus extracted and a distortion ratio calculating portion 26 for calculating a distortion ratio of a source voltage distortion (a voltage amplitude of the distortion component/an amplitude of the source voltage) are provided after the distortion component extracting portion 11.

As shown in FIG. 9, the distortion component extracting portion 11 inputs line voltage waveforms VR-S, VS-T and VT-R containing a distortion component in the three-phase AC power supply 3 through an output from a line voltage detecting portion 6 and fundamental waveforms V'R-S, V'S-T and V'T-R which do not contain the distortion component but have an equal frequency to the line voltage waveform and an almost equal amplitude thereto through an output from the fundamental waveform generating portion 10. In the distortion component extracting portion 11, the fundamental waveform V'R-S is subtracted from the line voltage waveform VR-S through a subtractor 27. Similarly, the fundamental waveform V'S-T is subtracted from the line voltage waveform VS-T through a subtractor 28 and the fundamental waveform V'T-R is subtracted from the line voltage waveform VT-R through a subtractor 29. Accordingly, distortion components VfR-S, VfS-T and VfT-R of the line voltage waveform of the three-phase AC power supply 3 are extracted by the subtractors 27, 28 and 29 and are output from the distortion component extracting portion 11, respectively. The distortion components VfR-S, VfS-T and VfT-R output from the distortion component extracting portion 11 are input to the distortion component frequency detecting portion 24 and the distortion voltage detecting portion 25.

As shown in FIG. 8, the distortion component frequency detecting portion 24 inputs the distortion components VfR-S, VfS-T and VfT-R from the distortion component extracting portion 11 and detects frequencies of the distortion components. Moreover, the distortion voltage detecting portion 25 inputs the distortion components VfR-S, VfS-T and VfT-R from the distortion component extracting portion 11 and uses a moving average filter to integrate waveforms taking absolute values of the distortion components VfR-S, VfS-T and VfT-R by one cycle of each of the distortion components (an inverse number of the frequency), thereby detecting voltage amplitudes of the distortion components. Furthermore, the distortion ratio calculating portion 26 inputs an output (a source voltage) of a reference voltage detecting portion 12 and an output (a distortion component voltage) of the distortion voltage detecting portion 25 and divides them, thereby calculating a distortion ratio (the voltage amplitude of the distortion component/an amplitude of the source voltage).

By providing the distortion component extracting portion 11, the distortion component frequency detecting portion 24, the distortion voltage detecting portion 25 and the distortion ratio calculating portion 26, thus, it is possible to obtain the distortion frequency, the distortion amplitude and the distortion ratio of the distortion component of the line voltage waveform in the three-phase AC power supply 3 without using a special measuring device. By displaying the distortion frequency, the distortion amplitude and the distortion ratio of the distortion component of the line voltage waveform in the three-phase AC power supply 3 or giving a warning such as an alarm when the values depart from a predetermined range, it is possible to monitor a power state.

By monitoring the power state through the display or the warning, moreover, it is possible to grasp the power state before carrying out a regenerating operation. In the case in which the distortion component is mixed into the power supply and greatly influences the regenerating operation, therefore, it is possible to prevent the regenerating operation from being carried out, for example, to hinder a base driving signal from being output. Accordingly, it is possible to prevent the power supply and the regenerative converter from being broken down due to a flow of an overcurrent to them through the regenerating operation.

Third Embodiment

Description will be given to an embodiment in which a function for carrying out an ON/OFF control of a regenerative transistor depending on a state of a distortion component when the distortion component is mixed into a three-phase AC power supply is added to the first embodiment.

Figure 10:
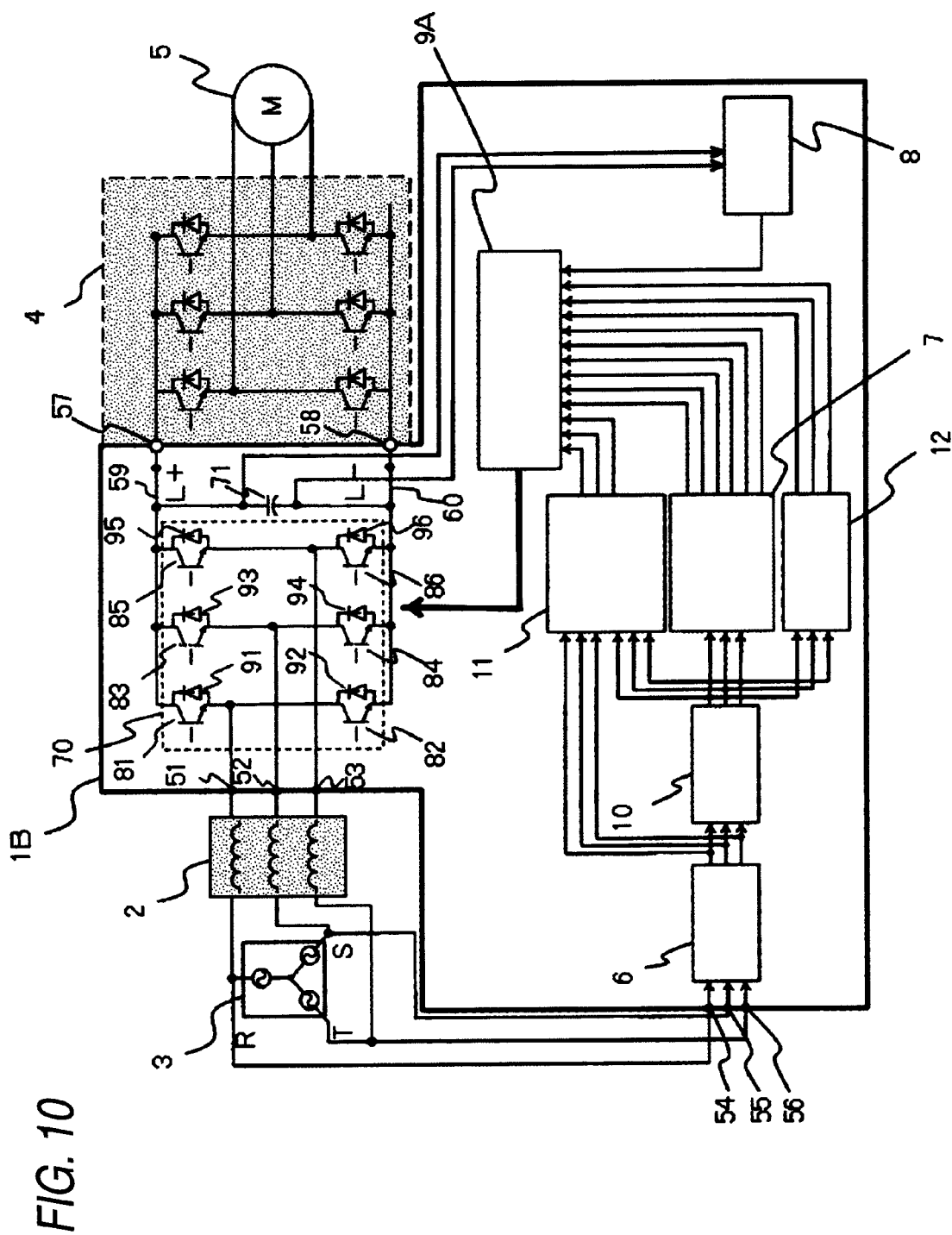
FIG. 10 is a block diagram showing a structure of the power regenerative converter.
Figure 11:
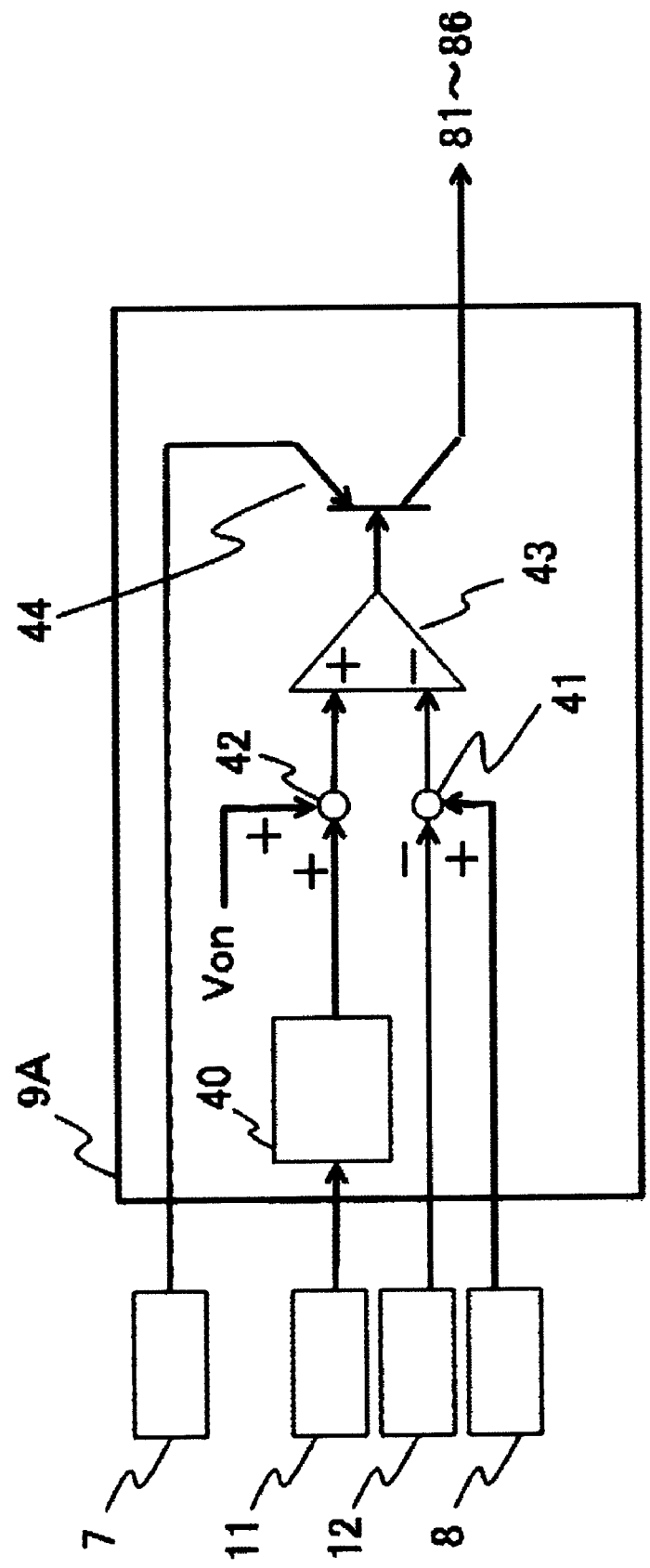
FIG. 11 is a block diagram showing an internal structure of the base driving signal output portion.
Figure 12:
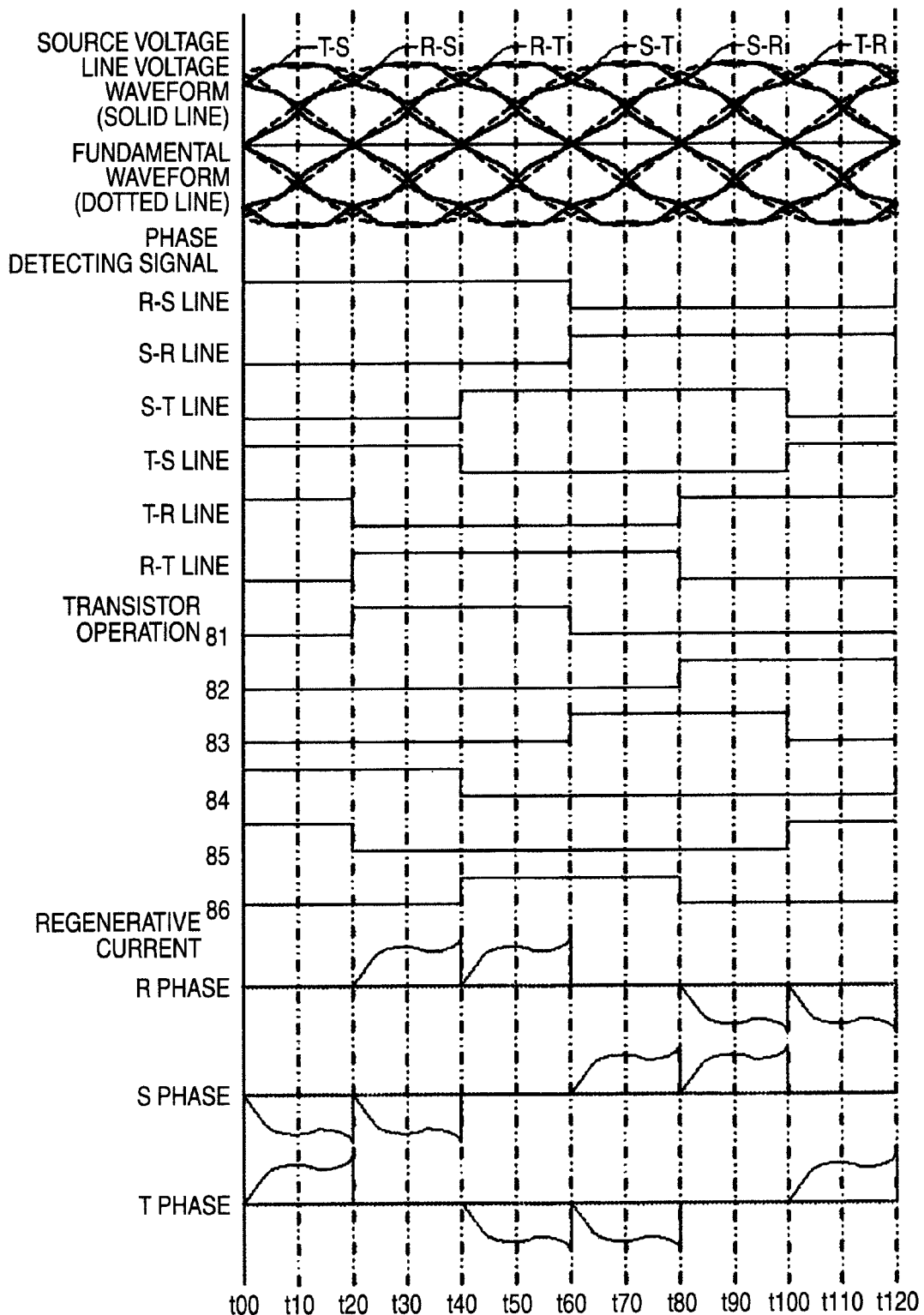
FIG. 12 is a time chart in a regenerating operation.

FIG. 10 is a block diagram showing a structure of a power regenerative converter according to the embodiment. FIG. 11 is a block diagram showing an internal structure of a base driving signal output portion 9A according to the embodiment. FIG. 12 is a time chart in a regenerating operation of a power regenerative converter 1B, showing a temporal change in a regenerative transistor and a regenerative current which correspond to a line voltage waveform and a fundamental waveform of a three-phase AC power supply 3 in which a distortion component is mixed.

In the power regenerative converter 1B according to the embodiment shown in FIG. 10, a distortion component extracting portion 11 for extracting a distortion component mixed into a source voltage waveform between three phases of the three-phase AC power supply 3 is provided after the fundamental waveform generating portion 10 of the power regenerative converter according to the first embodiment, and the base driving signal output portion 9A is provided in place of the base driving signal output portion 9 according to the first embodiment. An output of the distortion component extracting portion 11 is input to the base driving signal output potion 9A.

An operation in the base driving signal output portion 9A will be described with reference to FIG. 11.

The base driving signal output portion 9A inputs a signal output from the distortion component extracting portion 11, a signal output from a base driving signal creating portion 7, a signal output from a reference voltage detecting portion 12 and a signal output from a PN bus voltage detecting portion 8 respectively, and outputs a base driving signal to be used for an ON/OFF control of six regenerative transistors. The base driving signal output portion 9A has such a structure as to output the base driving signal and to start the regenerating operation when a difference value between a voltage value of the three-phase AC power supply 3 and a DC bus voltage value is equal to or greater than a certain threshold.

A line voltage value of the three-phase AC power supply 3 which is output from the reference voltage detecting portion 12 and has no distortion component mixed therein and the DC bus voltage value output from the PN bus voltage detecting portion 8 are input to a subtractor 41 in the base driving signal output portion 9A to calculate a difference between the line voltage value of the three-phase AC power supply 3 having no distortion component mixed therein and the DC bus voltage value. On the other hand, in order to prevent the regenerating operation from being carried out when the line voltage value of the three-phase AC power supply 3 is greater than the DC bus voltage, a voltage threshold for starting the regenerating operation corresponding to a drop or rise in a source voltage due to the distortion component is generated by using a regeneration starting voltage Von and the distortion component extracting portion 11 in the case in which the distortion component is not mixed. First of all, the signal output from the distortion component extracting portion 11 is input to a distortion component correcting portion 40 and is thus corrected, and the corrected signal is output. The distortion component correcting portion 40 maintains a cycle of the distortion component and carries out a correction except for the cycle (for example, an amplitude). Accordingly, the distortion component correcting portion 40 may multiply the output signal of the distortion component extracting portion 11 by a constant, for example. A signal output from the distortion component correcting portion 40 and the regeneration starting voltage Von are input to an adder 42. The regeneration starting voltage Von is a constant which is predetermined as a threshold for starting the regenerating operation. Therefore, a signal output from the adder 42 is synchronized with a cycle of a drop or rise in a voltage of a power supply which is caused by the distortion component. Accordingly, the signal output from the adder 42 can be set to be a voltage threshold for starting the regenerating operation corresponding to a drop or rise in a source voltage which is caused by the distortion component.

The output of the adder 42 and that of the subtractor 41 are input to a comparator 43, and the signal output from the subtractor 41 is compared with the signal output from the adder 42. Moreover, the signal output from the base driving signal creating portion 7 is input to a collector portion of a switch 44 and a signal output from the comparator 43 is connected to a gate portion of the switch 44. An emitter portion of the switch 44 is connected to gate portions of regenerative transistors 81 to 86, respectively. When the signal output from the subtractor 41 is larger than the signal output from the adder 42, the switch 44 is turned ON. When the switch 44 is turned ON, a base driving signal created by the base driving signal creating portion 7 is output from the base driving signal output portion 9A. The base driving signal which is output is input to the respective regenerative transistors to carry out the ON/OFF control of the regenerative transistors.

As described above, by extracting the distortion component of the three-phase AC power supply 3 and changing the voltage threshold of the regenerating start corresponding to the distortion component, it is possible to carry out the ON/OFF control of the regenerative transistors in an accurate timing. Accordingly, also in the case in which an influence of the distortion component on the regenerating operation is great, conventionally, it is possible to execute a stable regenerating operation. Consequently, an overvoltage or an overcurrent can be prevented from being applied to the power supply or the regenerative converter due to the regenerating operation. Thus, it is possible to prevent the power supply or the regenerative converter from being broken down due to the regenerating operation. As a result, it is possible to prevent a system from being stopped.

Industrial Applicability

The power regenerative converter according to the invention is suitable for the case in which a stable regenerating operation can be obtained in a three-phase AC power supply in which a source voltage distortion is mixed.

The invention claimed is:

1. A power regenerative converter comprising:
a smoothing capacitor for storing an induced electromotive force generated by a three-phase induction motor;
a regenerative transistor for switching a terminal voltage of the smoothing capacitor to carry out a power regenerating operation over a three-phase AC power supply;
a line voltage detecting portion for detecting a line voltage of the three-phase AC power supply;
a fundamental waveform generating portion for generating, from a signal output from the line voltage detecting portion, a fundamental waveform defined to be a line voltage waveform of the three-phase AC power supply in which a source voltage distortion component is not mixed;
a base driving signal creating portion for creating a base driving signal to be used for an ON/OFF control of the regenerative transistor based on a signal output from the fundamental waveform generating portion; and
a base driving signal output portion for outputting the base driving signal.

2. The power regenerative converter according to claim 1, further comprising:
a reference voltage detecting portion for detecting a source voltage of the three-phase AC power supply from the signal output from the fundamental waveform generating portion; and
a PN bus voltage detecting portion for detecting the terminal voltage of the smoothing capacitor,
wherein
the base driving signal output portion inputs a signal output from the base driving signal creating portion, a signal output from the reference voltage detecting portion and a signal output from the PN bus voltage detecting portion, and the base driving signal output is turned ON/OFF based on a difference value between the signal output from the reference voltage detecting portion and the signal output from the PN bus voltage detecting portion.

3. The power regenerative converter according to claim 1 or 2,
wherein
the fundamental waveform generating potion includes:
a radio frequency component removing filter portion for removing a distortion component from the output signal of the line voltage detecting portion;
a frequency calculating portion for calculating a frequency of a signal output from the radio frequency component removing filter portion; and
a correcting portion for correcting at least one of an amplitude and a phase in the signal output from the radio frequency component removing filter portion.

4. A power regenerative converter comprising:
a smoothing capacitor for storing an induced electromotive force generated by a three-phase induction motor;
a regenerative transistor for switching a terminal voltage of the smoothing capacitor to carry out a power regenerating operation over a three-phase AC power supply;
a line voltage detecting portion for detecting a line voltage of the three-phase AC power supply;
a fundamental waveform generating portion for generating, from a signal output from the line voltage detecting portion, a fundamental waveform defined to be a line voltage waveform of the three-phase AC power supply in which a source voltage distortion component is not mixed;
a base driving signal creating portion for creating a base driving signal to be used for an ON/OFF control of the regenerative transistor based on a signal output from the fundamental waveform generating portion;
a base driving signal output portion for outputting the base driving signal; and
a distortion component extracting portion for extracting a source voltage distortion component mixed in the three-phase AC power supply based on the signal output from the line voltage detecting portion and the signal output from the fundamental waveform generating portion, and
at least one of a distortion voltage calculating portion for calculating a voltage amplitude of the source voltage distortion component from a signal output from the distortion component extracting portion, a distortion component frequency calculating portion for calculating a frequency component of the source voltage distortion component from the output signal of the distortion component extracting portion, and a distortion ratio calculating portion for calculating a distortion ratio of the source voltage distortion from a signal output from the distortion voltage calculating portion and a signal output from the reference voltage detecting portion.

5. The power regenerative converter according to claim 4,
wherein
the fundamental waveform generating potion includes:
a radio frequency component removing filter portion for removing a distortion component from the output signal of the line voltage detecting portion;
a frequency calculating portion for calculating a frequency of a signal output from the radio frequency component removing filter portion; and
a correcting portion for correcting at least one of an amplitude and a phase in the signal output from the radio frequency component removing filter portion.

6. The power regenerative converter according to claim 4 or 5,
wherein
the distortion component extracting portion includes a subtracting portion for taking a difference between the signal output from the line voltage detecting portion and the signal output from the fundamental waveform generating portion.

7. A power regenerative converter comprising:
a smoothing capacitor for storing an induced electromotive force generated by a three-phase induction motor;
a regenerative transistor for switching a terminal voltage of the smoothing capacitor to carry out a power regenerating operation over a three-phase AC power supply;
a line voltage detecting portion for detecting a line voltage of the three-phase AC power supply;
a fundamental waveform generating portion for generating, from a signal output from the line voltage detecting portion, a fundamental waveform defined to be a line voltage waveform of the three-phase AC power supply in which a source voltage distortion component is not mixed;
a base driving signal creating portion for creating a base driving signal to be used for an ON/OFF control of the regenerative transistor based on a signal output from the fundamental waveform generating portion;
a base driving signal output portion for outputting the base driving signal;
a distortion component extracting portion for extracting a source voltage distortion component mixed in the three-phase AC power supply based on the signal output from the line voltage detecting portion and the signal output from the fundamental waveform generating portion;
a reference voltage detecting portion for detecting a source voltage of the three-phase AC power supply from the signal output from the fundamental waveform generating portion; and
a PN bus voltage detecting portion for detecting the terminal voltage of the smoothing capacitor;
wherein
the base driving signal output portion includes:
a distortion component correcting portion for correcting a signal output from the distortion component extracting portion;
an adder for adding a regeneration starting voltage to be a threshold for starting a regenerating operation in the case in which the source voltage distortion is not mixed and a signal output from the distortion component correcting portion;
a subtractor for inputting a signal output from the PN bus voltage detecting portion and a signal output from the reference voltage detecting portion and carrying out a subtraction;
a comparator for inputting and comparing a signal output from the adder and a signal output from the subtractor; and
a switch portion for outputting a signal output from the base driving signal creating portion to the regenerative transistor.

8. The power regenerative converter according to claim 7,
wherein
the distortion component correcting portion maintains a cycle of the signal output from the distortion component extracting portion and carries out a correction except for the cycle.

9. The power regenerative converter according to claim 7 or 8,
wherein
the fundamental waveform generating potion includes:
a radio frequency component removing filter portion for removing a distortion component from the output signal of the line voltage detecting portion;
a frequency calculating portion for calculating a frequency of a signal output from the radio frequency component removing filter portion; and
a correcting portion for correcting at least one of an amplitude and a phase in the signal output from the radio frequency component removing filter portion.

10. The power regenerative converter according to claim 7 or 8,
wherein
the distortion component extracting portion includes a subtracting portion for taking a difference between the signal output from the line voltage detecting portion and the signal output from the fundamental waveform generating portion.

* * * * *